United States Patent
Sadana et al.

(10) Patent No.: US 8,971,842 B2
(45) Date of Patent: Mar. 3, 2015

(54) ENTERPRISE MOBILE APPLICATION STORE

(75) Inventors: Rajeev Kumar Sadana, Green Brook, NJ (US); Manish Milan Chhadua, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 13/495,571

(22) Filed: Jun. 13, 2012

(65) Prior Publication Data

US 2013/0095785 A1  Apr. 18, 2013

Related U.S. Application Data

(60) Provisional application No. 61/546,403, filed on Oct. 12, 2011.

(51) Int. Cl.
| | | |
|---|---|---|
| *G06F 17/30* | (2006.01) | |
| *G06Q 10/10* | (2012.01) | |
| *H04L 12/14* | (2006.01) | |
| *G06Q 30/02* | (2012.01) | |
| *H04W 4/00* | (2009.01) | |
| *H04M 15/00* | (2006.01) | |
| *H04W 4/24* | (2009.01) | |

(52) U.S. Cl.
CPC ............ *G06Q 10/10* (2013.01); *H04L 12/1475* (2013.01); *G06Q 30/02* (2013.01); *H04W 4/003* (2013.01); *H04M 15/09* (2013.01); *H04M 15/68* (2013.01); *H04W 4/24* (2013.01)
USPC .......................................... 455/406; 455/419

(58) Field of Classification Search
None
See application file for complete search history.

(56) References Cited

U.S. PATENT DOCUMENTS

| | | | |
|---|---|---|---|
| 8,230,415 B1* | 7/2012 | Thomas ......................... | 717/173 |
| 2004/0203681 A1* | 10/2004 | Ross et al. .................... | 455/418 |
| 2006/0270386 A1* | 11/2006 | Yu et al. ........................ | 455/406 |
| 2007/0299940 A1* | 12/2007 | Gbadegesin et al. ......... | 709/220 |
| 2009/0163183 A1* | 6/2009 | O'Donoghue et al. ..... | 455/414.1 |
| 2009/0271778 A1* | 10/2009 | Mandyam et al. ............ | 717/171 |
| 2009/0307105 A1* | 12/2009 | Lemay et al. .................. | 705/26 |
| 2010/0076871 A1* | 3/2010 | Lloyd et al. .................... | 705/27 |
| 2010/0145861 A1* | 6/2010 | Law et al. ...................... | 705/76 |
| 2010/0197219 A1* | 8/2010 | Issa et al. .................... | 455/3.06 |
| 2010/0235261 A1* | 9/2010 | Lloyd et al. .................... | 705/27 |
| 2010/0262619 A1* | 10/2010 | Zargahi et al. ................ | 707/770 |
| 2011/0270721 A1* | 11/2011 | Kusterer ......................... | 705/32 |
| 2012/0117620 A1* | 5/2012 | Cassidy et al. .................. | 726/3 |
| 2012/0184255 A1* | 7/2012 | Macaluso ................. | 455/414.3 |
| 2012/0214451 A1* | 8/2012 | Richardson et al. ....... | 455/414.1 |
| 2012/0291103 A1* | 11/2012 | Cohen .............................. | 726/4 |
| 2013/0130643 A1* | 5/2013 | Bacareza et al. .............. | 455/406 |

* cited by examiner

*Primary Examiner* — Vladimir Magloire
*Assistant Examiner* — Frank Donado

(57) ABSTRACT

A mobile enterprise application store includes downloadable mobile applications and catalogs of the mobile applications. Different sets of applications may be offered to visitors depending on whether they have an account with a particular wireless mobile communication carrier. Different versions of the mobile applications may be stored and provided for visitors that use different carriers, devices, and/or operating systems. Offering or downloading of certain applications may be limited to only those visitors having consent from an enterprise administrator. The store may automatically request this consent and process the response. The mobile application store may only be accessible to employees, agents, representatives, and/or consultants of the enterprise. The store may offer split billing such that charges for some applications are made to the account of the visitor, while charges for other applications are made to the enterprise.

23 Claims, 5 Drawing Sheets

ENTERPRISE MOBILE APPLICATION STORE

CROSS-REFERENCE TO RELATED APPLICATION

This application is based upon and claims priority to U.S. provisional patent application 61/546,403, entitled "Enterprise Mobile Application Store," filed Oct. 12, 2011. The entire content of this application is incorporated herein by reference.

BACKGROUND

1. Technical Field

This disclosure relates to wireless mobile communication devices, mobile applications that are used within wireless mobile communication devices, application stores that supply mobile applications, and to enterprises that are associated with users of wireless mobile communication devices.

2. Description of Related Art

Persons associated with enterprises, such as business enterprises, may need to use wireless mobile communication devices in connection with efforts that they make relating to the enterprises. The enterprises, in turn, may wish to make proprietary and non-proprietary mobile applications available to their associates to assist with these needs. These associates may, for example, be employees and/or business partners of the enterprises. Payment for some of these mobile applications must also sometimes be made to developers of the mobile applications and/or others.

Persons associated with an enterprise, however, may use a wide variety of wireless mobile communication devices, as well as different types of wireless mobile communication device platforms, such Apple®, Blackberry®, and Android®. Each platform may require its own unique version of the same enterprise mobile application. These persons may also utilize different wireless mobile communication carriers, each of which may have its own systems, such as its own billing and user-verification systems.

Usage of non-proprietary applications by associates of the enterprises may also require legal usage rights to be obtained. The enterprises may also not want to make all applications available to all associates. These differences in platforms and carriers and the complexities of obtaining needed legal usage rights and in regulating which associates have access to which applications may make it difficult for enterprises to provide libraries of mobile applications for their associates. A solution to this problem is needed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
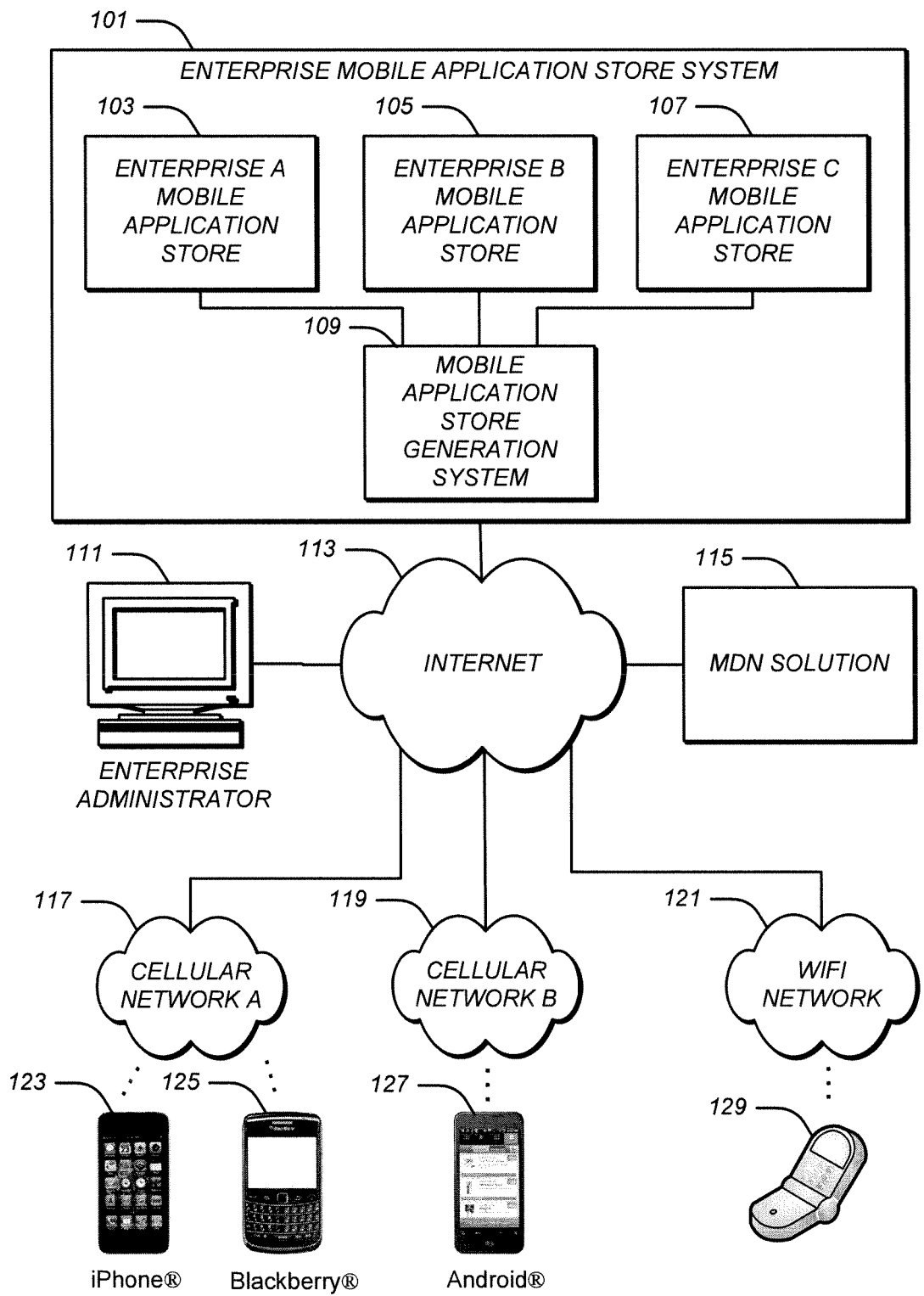
FIG. 1 illustrates examples of communication networks and computer systems associated with them, including an enterprise mobile application store system, an enterprise administrator station, the Internet, a low level MDN solution, a cellular network A, a cellular network B, a WiFi network, and wireless mobile communication devices.

FIG. 1 illustrates examples of communication networks and computer systems associated with them, including an enterprise mobile application store system 101, an enterprise administrator station 111, the Internet 113, a low level MDN solution 115, a cellular network A 117, a cellular network B 119, a WiFi network 121, and wireless mobile communication devices 123, 125, 127, and 129.

The enterprise mobile application store system 101 includes a mobile application store generation system 109 that is configured to generate one or more enterprise mobile application stores, such as an enterprise A mobile application store 103, an enterprise B mobile application store 105, and an enterprise C mobile application store 107.

Each enterprise mobile application store is associated with a particular enterprise, such as with a particular business or organization. Each enterprise mobile application store is configured to allow a visitor to the mobile application store to select one or more mobile applications for use in connection with a wireless mobile communication device that is associated with the visitor. The available applications may include generic applications that are available in multiple mobile application stores, as well as proprietary or customized applications that are unique to the particular enterprise mobile application store. Each application store may be configured to communicate with and to provide applications that are appropriate for different types of wireless mobile communication devices, different types of operating systems that are in wireless mobile communication devices, and/or wireless mobile communication devices that communicate through different cellular networks.

The mobile application store generation system 109 is configured to be accessed by an administrator of the enterprise mobile application store system 101 and to receive instructions from the administrator as to the composition of each mobile application store. The instructions may include information identifying the enterprise that is to be associated with the store, the identity of one or more administrators that are to manage the store, and default configuration information, such as a default set of mobile applications that are to be offered by the store. Once this configuration information is provided, the mobile application store generation system 109 generates the software needed to establish the mobile application store specified by these instructions.

Each store may then be customized by the enterprise that is associated with that store. The customization may include customizing what mobile applications are available, who can have access to them, and the appearance of the user interface to its enterprise mobile application store.

The enterprise mobile application store system 101 may consist of a single computer or multiple computers networked together. All of the mobile application stores may share a single computer or a set of computers. Each mobile application store may instead be managed by a computer or set of computers that is separate from the computer or set of computers that manages the other stores.

The enterprise mobile application store system 101 may be hosted by a wireless communication carrier or by someone else. The enterprise mobile application store system 101, the mobile application store generation system 109, and each of the mobile application stores 103, 105, and 107 are configured to communicate through the Internet 113 with other devices and systems, such as with the enterprise administrator station 111, the MDN solution 115, the cellular network A 117, the cellular network B 119, and the WiFi network 121. In turn, each cellular network and WiFi network is configured to communicate with one or more wireless mobile communication devices. For example, the cellular network a 117 is configured to communicate with wireless mobile communication devices 123 and 125; the cellular network B 119 is configured to communicate with the wireless mobile communication device 127; and the WiFi network 121 is configured to communicate with the wireless mobile communication device 129.

The wireless mobile communication devices may be of any type. For example, they may be smart phones, laptops, netbooks, PDAs, or tablet computers. For example, the wireless mobile communication device 123 may be an iPhone®, the wireless mobile communication device 125 may be a Blackberry®, and the wireless mobile communication device 127 may be an Android®. The operating systems in the wireless mobile communication devices may also be different.

Each wireless mobile communication device may have an enterprise mobile application store client installed within it. A different version of this client may be provided for each different type of device platform, such as for each different type of operating system (OS). The client may be configured to automatically download a set of mobile applications that has been predetermined by the enterprise, or at least to propose such a set for the user to approve (and then download the set once manually approved). The user interface generated by the client and/or the enterprise mobile application store may be customizable by the enterprise to display desired text, colors, and branding. The client may be configured to receive and install updates of itself from the enterprise mobile application store and/or from elsewhere.

The enterprise administrator station 111 is configured to communicate with one of the mobile application stores, such as with the enterprise A mobile application store 103. Other enterprise administrators may be provided to communicate with the other mobile application stores and/or with the mobile application store generation system 109. Each enterprise administrator is configured to allow an administrator to setup, modify, and monitor the operations of one the stores or the mobile application store generation system 109.

The low level MDN solution 115 is configured to secure, monitor, manage and support mobile devices. One or more of the enterprise mobile application stores may be configured to interface with the low level MDN solution 115 to verify the authority of visitors to the store to request mobile applications. This may include interfaces that create and manage white and black lists of applications, manage users and group policies, and create hashes for applications.

Figure 2:
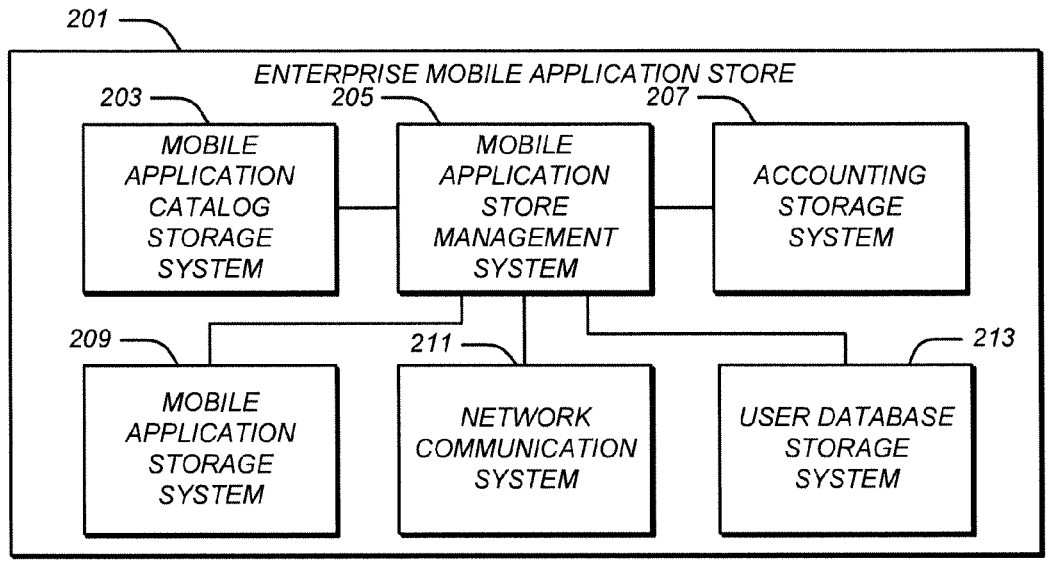
FIG. 2 illustrates an example of an enterprise mobile application store.

FIG. 2 illustrates an example of an enterprise mobile application store 201. The enterprise mobile application store 201 may serve as the enterprise A mobile application store 103, the enterprise B mobile application store 105, and/or the enterprise C mobile application store 107.

The enterprise mobile application store system 101 includes a mobile application catalog storage system 203, a mobile application store management system 205, an accounting storage system 207, a mobile application storage system 209, a network communication system 211, and a user database storage system 213. One, some, or all of these subsystems of the enterprise mobile application store 201 may be shared between the various mobile application stores within the enterprise mobile application store system 101.

The mobile application catalog storage system 203 stores various catalogs of mobile applications that may be made available for selection by visitors to the enterprise mobile application store 201. The various catalogs may each include data in a table. One column in the table, for example, may be the name of the mobile application. Another column, for example, may be an identification number associated with the mobile application. A still further column in the table may contain information indicating whether use of the application requires a payment and, if so, how much and by whom. For example, the information may indicated that payment may be required to be made by the enterprise, the visitor, and/or a third party. The information may specify a different payment amount, depending upon which entity makes the payment. A still further column in the table may contain information indicating whether consent is required before the mobile application can be used by the visitor, such as consent from an administrator of the enterprise that is associated with the store and/or another person. The information in the catalog may also include information that causes the set of available applications that are offered to the visitor to vary depending upon the device being used by the visitor to access the store and/or other circumstances. All of the various catalogs may instead be in a single consolidated table, with an additional column identifying the catalog or catalogs in which the particular mobile application should be listed. In other configurations, the mobile application catalog storage system 203 may be located elsewhere, such as on a separate server. Each enterprise may be allowed to create its own catalog of mobile applications that are available at its hosted enterprise mobile application store.

The mobile application storage system 209 stores the various mobile applications that may be selected by one or more visitors to the enterprise mobile application store 201. In other configurations, these mobile applications may be located elsewhere, such as on a separate server.

The mobile applications that are made available in an enterprise mobile application store may be of any type. For example, they may relate to sales, marketing, customer support, inventory, manufacture, management, payroll, financing, human resources, and/or personal work-related or perhaps non-work-related mobile applications.

The user database storage system 213 is configured to store information about users of the enterprise mobile application store 201. For example, the user database storage system 213 may contain a user name and password for each visitor and administrator. The user database storage system 213 may contain additional information about each user, such as information about the relationship between the user and the enterprise that is associated with the enterprise mobile application store 201.

The network communication system 211 is configured to allow the enterprise mobile application store 201 to communicate with one or more computer networks, such as the Internet 113. The network communication system 211 may include any type of network communication device or devices, such as a network interface card.

The accounting storage system 207 is configured to store information about transactions that visitors to the store enter into, such as the date of the transaction, the time of the transaction, the identity of the visitor, the mobile applications selected by the visitor, whether the requested applications have been supplied, charges that have or are to be made for one or more of the selected applications, and/or the person or persons that are to be billed for transaction.

The mobile application store management system 205 is configured to manage some or all of the operations of the enterprise mobile application store 201. For example, the mobile application store management system 205 may be configured to authenticate each visitor and administrator before granting the visitor or administrator access to any of the services or information within the store. The mobile application store management system 205 may be configured to allow only employees, agents, representatives, or consultants of the enterprise to visit the store. This configuration may not allow communications with others, such as mere customers of the enterprise. Other examples of operations performed by the mobile application store management system 205 are described below.

Figure 3:
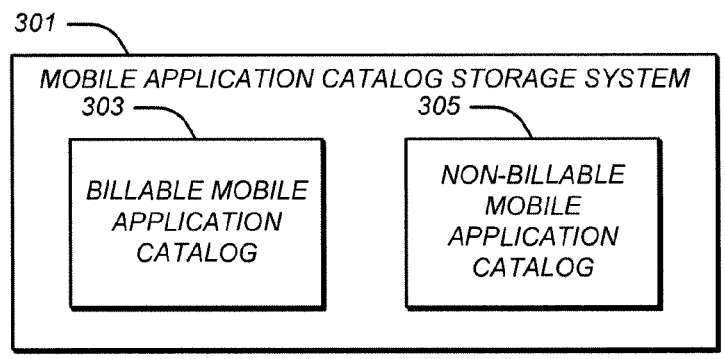
FIG. 3 illustrates an example of a mobile application catalog storage system that contains billable mobile application catalog and non-billable mobile application catalog.

FIG. 3 illustrates an example of a mobile application catalog storage system 301 that contains billable mobile application catalog 303 and non-billable mobile application catalog 305. The billable mobile application catalog 303 catalogs various mobile applications that may be selected by a visitor, at least one of which requires a payment to be made to a particular wireless mobile communication carrier. The non-billable mobile application catalog 305 may also catalog mobile applications that may be selected by the visitor. However, none of them may require payment to be made to the particular carrier. The non-billable mobile application catalog 305 may contain all of the mobile applications that are catalogued in the billable mobile application catalog 303, except for those that require payment to be made to the particular carrier.

The mobile application store management system 205 is configured to receive requests from visitors to the enterprise mobile application store 201 for a catalog of mobile applications that may be selected by the visitor. The mobile application store management system 205 is configured to determine whether the visitor making the request has an active account with the particular wireless mobile communication carrier to which payment must be made for certain applications in the billable mobile application catalog 303. This information may be contained in the user database storage system 213 and/or in the MDN solution 115. If the visitor has an active account with the particular wireless mobile communication carrier, the mobile application store management system 205 is configured to cause the billable mobile application catalog 303 to be provided to the visitor. If the visitor does not have an active account with the particular wireless mobile carrier, the mobile application store management system 205 is configured to cause the non-billable mobile application catalog 305 to be provided to the visitor. In this way, the catalog that is provided to a visitor does not include mobile applications that can only be paid for by billings to a particular wireless mobile communication carrier with whom the visitor does not have an account. In some situations, or at least for some applications, the enterprise may be willing to pay the bill and/or the person may be willing or otherwise required to pay through the enterprise. In these situations, there may not be a need to consider whether the visitor has an account with a particular wireless mobile carrier.

Figure 4:
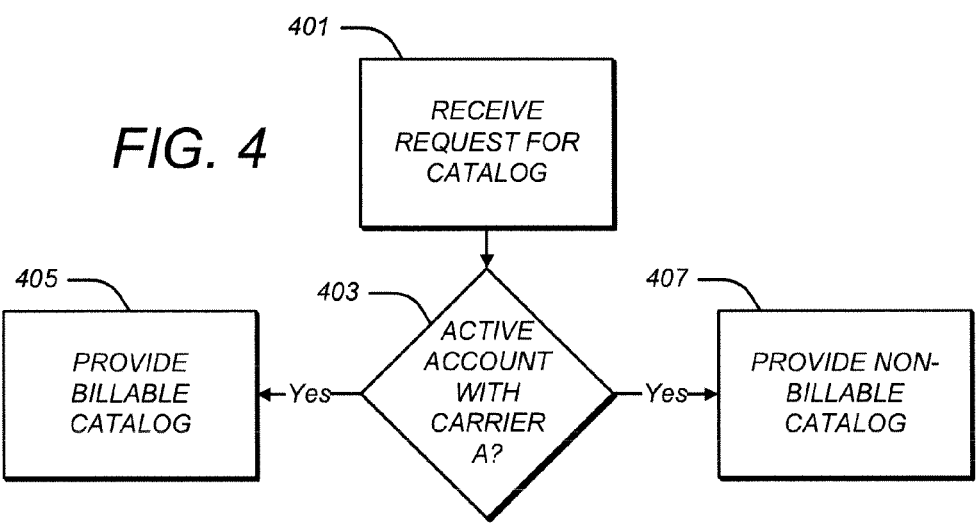
FIG. 4 illustrates an example of a process for requesting and providing a catalog of available mobile applications.

FIG. 4 illustrates an example of a process for requesting and providing a catalog of available mobile applications. This process may be implemented by the mobile application store management system 205. A request for a catalog may be made by a visitor, as reflected by a Receive Request for Catalog step 401. The mobile application store management system 205 then determines, based on identifying information provided by the visitor and/or the device being used by the visitor, whether the visitor has an account with the particular wireless mobile communication carrier that must be billed for the selection of certain mobile applications. This is reflected in an Active Account with Carrier A? decision step 403. If the visitor has an active account with carrier A, the mobile application store management system 205 causes the billable mobile application catalog 303 to be provided to the visitor, as reflected by Provide Billable Catalog step 405. Otherwise, the mobile application store management system 205 causes the non-billable mobile application catalog 305 to be provided to the visitor, as reflected by Provide Non-Billable Catalog step 407.

The mobile application catalog storage system 203 may also contain different catalogs for different groups of visitors that contain different sets of available mobile applications. The different groups may be of any type. For example, there may be a different group for employees, managers, and executives of the enterprise, and/or different groups for agents and representatives of the enterprise. The mobile application store management system 205 may be configured to present each authenticated visitor with the catalog that is appropriate for the group to which the visitor belongs, as reflected in the user database storage system and/or the MDN solution 115.

The mobile application store management system 205 may be configured to allow each authenticated visitor to select one or more mobile applications from the catalog that is provided to the visitor. The mobile application store management system 205 may be configured to download each selected application to the visitor from the mobile application storage system 209 and/or to provide activation information that may enable the visitor to activate the application when obtained from a different source.

The mobile application store management system 205 may be configured to cause charges for billable mobile applications that are selected to be billed to the enterprise with whom a visitor is associated and/or to the visitor's account with the particular wireless mobile communication carrier. The mobile application store management system 205 may be configured to cause the visitor to be billed for the selection of one application, but to cause the enterprise with whom the visitor is associated to be billed for another selected application. The mobile application store management system 205 may also or instead be configured to cause an account of the visitor to be billed for a selected mobile application that is separate from the visitor's account with the particular wireless mobile carrier.

Billing for a particular transaction associated with the enterprise mobile application store may occur when an application is downloaded by the visitor. In cases in which the visitor or enterprise has the ability to cancel an install after a download, the billing may occur only after a successful install. The accounting storage system 207 may store records that include the name of the visitor, the MDN of the visitor, the time when the download was completed, the time when the download was successfully installed, and a unique event ID. The visitor may be provided with information about the size of the application and, if the download is not paid for by the enterprise, a notification about download/usage charges and an opt-in acceptance of the charges. An interrupted download may abort completely and, if so, no transaction file may be created. In this case, the visitor may be provided an error message on the wireless mobile device and may need to go through the process from the beginning. The system may provide confirmation of a successful download. If the download was completed but transmission of such confirmation is not successful, the acknowledgement may be queued and may be sent the next time the device makes a network connection. In this case, the visitor may not be able to use the application until a confirmation of the successful download is received by the system (and the end user may not be billed or the developer paid until that point).

Some of the mobile applications that are available for selection may have been acquired by the enterprise that is associated with the enterprise mobile application store 201 under a flat fee licensing agreement. The agreement may authorize the enterprise to distribute an unlimited number of copies of the application to an unlimited number of persons that are associated with the enterprise. In this situation, the mobile application store management system 205 may be configured not to keep track of the number of such applications that are selected and not to cause any charge to be imposed for their selection.

The same non-proprietary mobile application may be made available by the hosting service to multiple enterprise mobile applications stores. The hosting service may enter into appropriate legal agreements with the developer of this mobile application that permit this type of distribution, thus alleviating the need for the enterprises to address such legal issues themselves. The hosting service may also manage the billing and collection of any payments that are required for use of such an application, again alleviating the enterprises from having to address such issues. In some cases, the enterprises may themselves pay these bills, in which case the hosting service may be configured to aggregate the charges incurred by associates of the enterprises and bill and collect the required payments from the enterprises.

The mobile application storage system 209 may be configured to store different versions of each mobile application, e.g., a different version for each different cellular network system over which a wireless mobile communication device may communicate, a different version for each different type of operating system that may be used on a wireless mobile communication device, and/or a different version for each different type of wireless mobile communication device.

Figure 5:
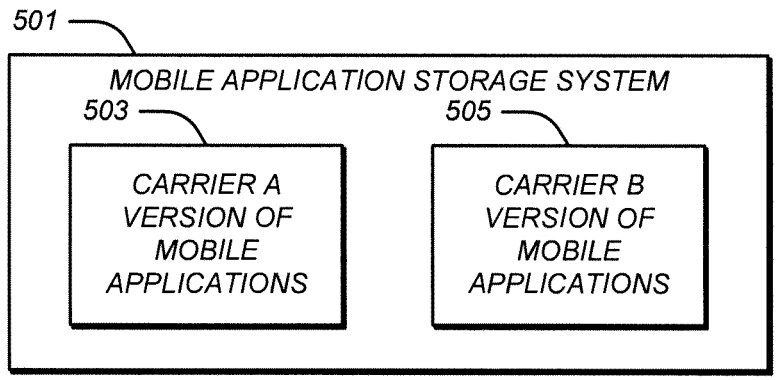
FIG. 5 illustrates an example of a mobile application storage system containing a carrier A version of mobile applications and a carrier B version of mobile applications.

FIG. 5 illustrates an example of a mobile application storage system 501 containing a carrier A version of mobile applications 503 and a carrier B version of mobile applications 505.

Figure 6:
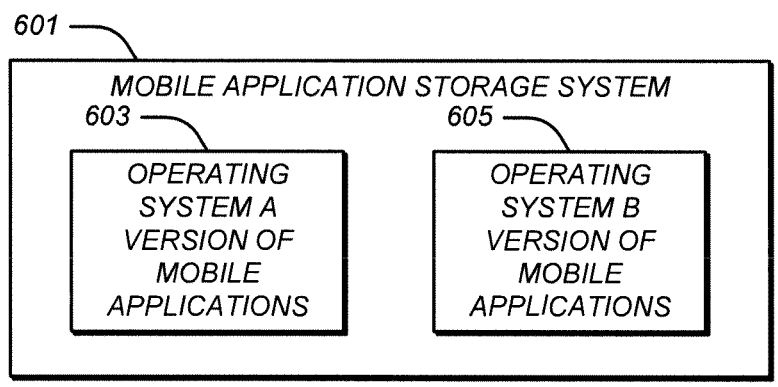
FIG. 6 illustrates an example of a mobile application storage system containing an operating system A version of mobile applications and an operator system B version of mobile applications.

FIG. 6 illustrates an example of a mobile application storage system 601 containing an operating system A version of mobile applications 603 and an operating system B version of mobile applications 605.

Figure 7:
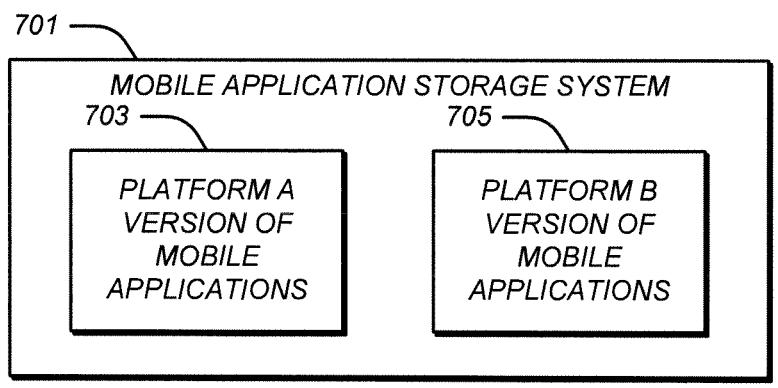
FIG. 7 illustrates an example of a mobile application storage system that includes a platform A version of mobile applications and a platform B version of mobile applications.

FIG. 7 illustrates an example of a mobile application storage system 701 that includes a platform A version of mobile applications 703 and a platform B version of mobile applications 705.

The mobile application store management system 205 may be configured to determine the wireless mobile communication carrier being utilized by each visitor, the operating system being used by each visitor's wireless mobile communication device, and the type of each visitor's wireless mobile communication device. The mobile application store management system 205 may be configured to cause the delivery of the version of mobile application that a visitor selects that is compatible with the user's wireless mobile communication carrier, operating system, and type of wireless mobile communication device.

Figure 8:
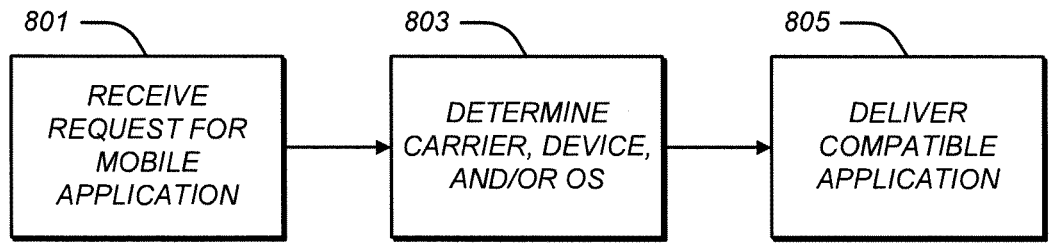
FIG. 8 illustrates an example of a process that provides a version of a requested mobile application that is compatible with the carrier, device, and/or operating system that is being used by the visitor.

FIG. 8 illustrates an example of a process that provides a version of a requested mobile application that is compatible with the carrier, device, and/or operating system that is being used by the visitor. This process may be implemented by the mobile application store management system 205. The visitor may request a particular mobile application, as reflected by a Receive Request for Mobile Application step 801. The mobile application store management system 205 then determines the particular carrier, device, and/or operating system being used by the visitor, as reflected by Determining Carrier, Device, and/or OS step 803. The mobile application store management system 205 may do so by accessing this information in the user database storage system 213, the MDN solution 115, and/or elsewhere. This information may also be supplied by communications from the visitor, either automatically or in response to questions asked of the visitor by the mobile application store management system 205. The mobile application store management system 205 then causes the version of the selected mobile application that is compatible with the visitor's carrier, device, and/or OS to be downloaded to the visitor from the mobile application storage system 209 or elsewhere.

One or more of the mobile applications that are stored within the mobile application storage system 209 may be customized by or on behalf of the enterprise that is associated with the enterprise mobile application store 201 before these applications are provided to visitors. The customization may include the selection of options and/or settings and/or other customizations that are configured to implement policies and/or to otherwise cause the customized applications to operate in a manner desired by the enterprise. The enterprise may be allowed to design all or portions of the user interface and/or to select customization options, such as of a number of templates from the hosting service. These customized mobile applications may be configured to prohibit a visitor from altering one or more of the customizations.

Some mobile applications may be configured to utilize the services of a cloud computing system that is provided and/or managed by developers or vendors of the applications. This may not provide an adequate level of security for some enterprises and/or for some types of data. In these cases, these mobile applications may be configured to enable the location of these cloud computing systems to be redirected to more secure cloud computing systems, such as to cloud computing systems that are owned or managed by the enterprise and/or that are dedicated to the enterprise. Each enterprise mobile application store may be configured to enable its enterprise to designate the cloud computing services that are to be utilized by such mobile applications and to reconfigure these mobile applications to make use of such cloud computing services before they are downloaded. Alternately, if there is no way to provide a desired level of security for a particular mobile application, the mobile application may not be offered, may be dependent on authorization, e.g., of the enterprise administrator, or may notify the visitor prior to the first (or each) use.

The mobile application store management system 205 may be configured to restrict the number of one or more mobile applications that may be selected to a predetermined number in order to comply with licensing restrictions. The accounting storage system 207 may be configured to keep track of the total number of each mobile application that has been selected, The mobile application store management system 205 may be configured to check this total number each time a mobile application is selected to verify that additional instances of the selected mobile application may be provided. Alternatively, the mobile application store management system 205 may be configured to remove any mobile application from the mobile application catalog storage system 203 that is no longer available due to a licensing limit having been reached. The mobile application store management system 205 may be configured to provide reports to the enterprise about this stored information automatically or on request.

One or more of the mobile applications in the mobile application storage system 209 may require consent from a person other than the visitor requesting the application before the application can be used by the visitor.

Figure 9:
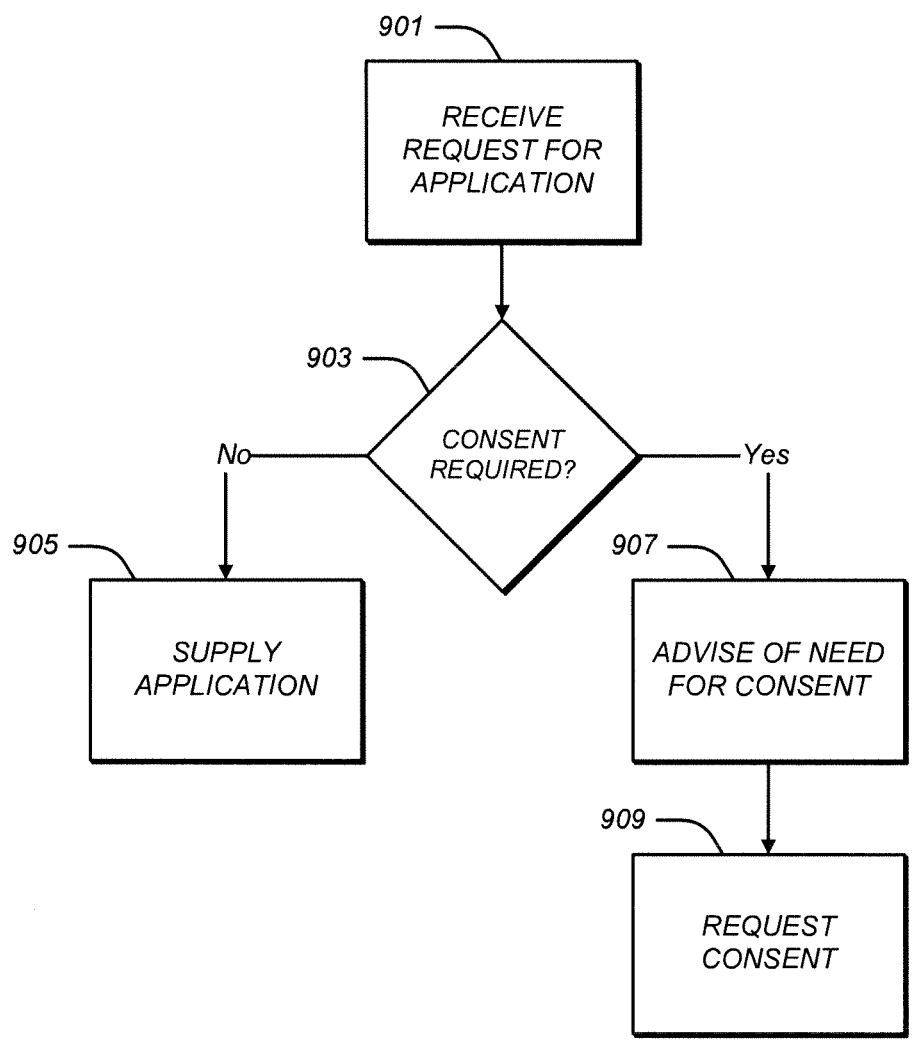
FIG. 9 illustrates an example of an automated process for requesting consent to supply a requested mobile application.

FIG. 9 illustrates an example of an automated process for requesting consent to supply a requested mobile application. A request for a mobile application is received, as reflected by a Receive Request For Application step 901. The mobile application store management system 205 then determines whether consent to use this application is required, as reflected by a Consent Required? decision step 903. This may be done, for example, by checking the mobile application catalog storage system 203 and/or the mobile application storage system 209 for information indicating that the requested application requires consent before being used. Mobile applications that require this consent may correspondingly be designated in the mobile application catalog storage system 203 and/or the mobile application storage system 209 as requiring such consent.

If no consent is required, the mobile application store management system 205 supplies the application, as reflected by a Supply Application step 905. If consent is required, on the other hand, the mobile application store management system 205 causes a notice to be issued to the visitor, advising of the need for such consent before the application may be used, as reflected by an Advise of Need for Consent step 907. This advisory may be provided to the visitor at the time the application is selected. The mobile application store management system 205 then causes a request for the needed consent to be issued, as reflected by a Request Consent step 909.

Any procedure may be followed by the mobile application store management system 205 for requesting the needed consent. For example, the mobile application store management system 205 may cause an e-mail containing a request for such consent to be sent to an enterprise administrator, such as to the enterprise administrator station 111. The e-mail may identify the visitor, the desired mobile application, the date of the request, and/or may contain other information. The request for consent may in addition or instead be posted in an enterprise administrator section of the enterprise mobile application store 201 in a manner that is brought to the attention of the enterprise administrator when the enterprise administrator logs into the enterprise mobile application store 201.

Figure 10:
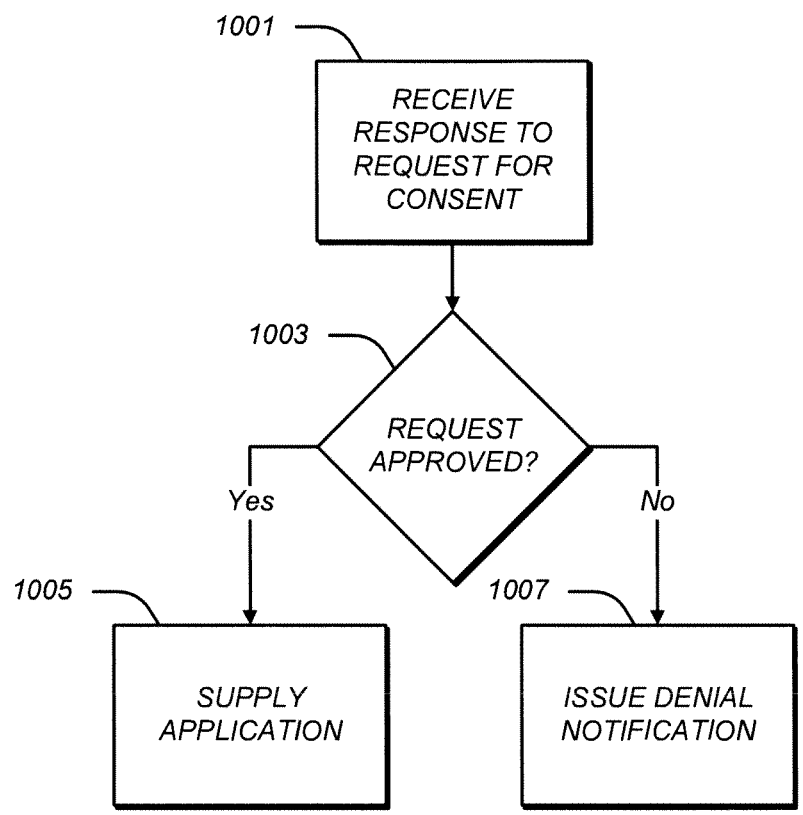
FIG. 10 illustrates an example of an automated process for handling a response to a request for consent to supply a requested mobile application.

FIG. 10 illustrates an example of an automated process for handling a response to a request for consent to supply a requested mobile application. The response to the request is received from the enterprise administrator, as reflected by a Receive Response To Request For Consent step 1001. The response may be received from the enterprise administrator, for example, in the form of an e-mail, text message, instant message, and/or a posting of the response at the enterprise mobile application store 201. The mobile application store management system 205 determines whether the response is an approval, as reflected by an Approved? decision step 1003. If approval is provided, the mobile application store management system 205 causes the requested application to be supplied to the visitor, as reflected by Supply Application step 1005. Otherwise, the mobile application store management system 205 does not supply the application, but rather notifies the visitor that the request for the application has been denied, as reflected by an Issue Denial Notification step 1007. This notification may be sent to the visitor by e-mail, text message, instant message, and/or posted to the enterprise mobile application store 201 in a fashion that comes to the attention of the visitor when the visitor next visits the enterprise mobile application store 201.

Unless otherwise indicated, the enterprise mobile application store system 101, enterprise administrator station 111, and MDN solution 115 that have been discussed herein are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system. Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

When use of an application requires another person's consent, the visitor may be allowed to download that application, or to obtain that application from another source, before that consent is obtained. In these configurations, the application may be configured not to run until a code is entered into the application by the user and/or remotely from another source. The needed code may only be provided upon the needed consent being provided.

Thus, various embodiments of the mobile application enterprise store are disclosed herein, some or all of which may be present in a single embodiment. In one embodiment, the selection of available mobile applications presented by the store varies depending upon whether a visitor to the store has an active account with a specific cellular carrier. In another embodiment, different versions of the mobile applications are available through the store, including those that are usable with different wireless carriers, on different mobile device brands, and on different mobile operating systems. In another embodiment, the mobile application enterprise store is accessible to employees of an enterprise, but not to customers of the enterprise. In another embodiment, the mobile application enterprise store automatically seeks an administrator's consent before delivering certain mobile applications after one or more are selected by the visitor. In another embodiment, the mobile application enterprise store interfaces with a low level MDN solution such that the MDN solution is able to provide an identification of allowable mobile applications and users to the store. In another embodiment, the mobile application enterprise store allows the enterprise to split the billings for certain applications and/or certain cellular services between the users of those applications/services and the enterprise. In another embodiment, application downloads to individual users are paid by the mobile application enterprise store as a flat fee for a block of downloaded applications, regardless of how many of the application(s) are actually downloaded and of how many times, rather than being paid for individually by the mobile application enterprise store. In another embodiment, the mobile application enterprise store allows the enterprise to pre-configure the applications in ways that are desired by the enterprise before they are downloaded.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim means that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exhaustive and that other elements may be included. Similarly, an element preceded by "a" or "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended embracement of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A mobile enterprise application store associated with an enterprise, the mobile enterprise application store comprising:
    a mobile application catalog storage system containing at least the following catalogs of mobile applications:
        a billable mobile application catalog including a first table that catalogs available mobile applications, at least one of the mobile applications requiring payment to a particular wireless mobile communication carrier as identified in the first table and at least one of the mobile applications not requiring payment to the particular wireless mobile communications carrier; and
        a non-billable mobile application catalog including a second table that catalogs available non-billable mobile applications, the non-billable mobile applications catalog including all of the available mobile applications in the billable mobile application catalog except those that require payment to the particular wireless mobile communication carrier;
    a mobile application store management system configured to receive requests from visitors to the mobile enterprise application store for a catalog of available mobile applications and to, in response to receiving a request for the catalog of available mobile applications:
        determine whether each visitor making a-the request has an active account with the particular wireless mobile communication carrier;

determine between which of the billable mobile application catalog and the non-billable mobile application catalog is to be provided to each visitor, such that the billable mobile application catalog is determined to be provided to each visitor that has an active account with the particular wireless mobile communication carrier and the non-billable mobile application catalog is determined to be provided to each visitor that does not have an active account with the particular wireless mobile communication carrier; and provide the determined catalog to each visitor.

2. The mobile enterprise application store of claim 1:

further comprising a mobile application storage system that contains a different version of each of multiple mobile applications for each of at least one of different wireless mobile communication carriers, operating systems, or wireless mobile communication devices; and wherein the mobile application store management system is configured to receive requests for mobile applications from visitors to the mobile enterprise application store and, in connection with each, to:

determine at least one of the wireless mobile communication carrier, operating system, or wireless mobile communication devices being used by the visitor that made the request; and based on the determination of the at least one of the wireless mobile communication carrier, operating system, or wireless mobile communication devices, cause the version of each requested mobile application that is for the at least one of the wireless mobile communication carrier, operating system, or wireless mobile communication device to be delivered to the visitor.

3. The mobile enterprise application store of claim 1 wherein the mobile application store management system is configured to receive requests for mobile applications from visitors to the mobile enterprise application store and to cause:

a charge for at least one of the mobile applications that is requested to be placed on a bill of the visitor; and a charge for at least another of the mobile applications that is requested to be placed on a bill of the enterprise.

4. The mobile enterprise application store of claim 1 wherein the mobile application store management system is configured not to process requests for the catalog of available mobile applications that are received from customers of the enterprise unless they are also employees, agents, representatives, or consultants of the enterprise.

5. The mobile enterprise application store of claim 1 wherein the mobile application store management system is configured to:

receive requests from visitors to the mobile enterprise application store for one or more mobile applications in one or more of the catalogs, at least one of the mobile applications requiring consent from someone other than the visitor requesting the application before the application can be used by the visitor;

determine whether any request is for a mobile application that requires consent from someone other than the visitor before the application can be used by the visitor;

if consent is required:

automatically cause a request for the consent to be issued;

receive a response to the request for the consent;

determine whether the response is to grant the request; and dependent on the response, grant or not grant the visitor use of the mobile application such that if the response is to grant the request, the visitor is allowed to use the mobile application, while if the response is not to grant the request, the visitor is not allowed to use the mobile application; and if consent is not required, allow the visitor to use the mobile application without issuing a request for consent.

6. The mobile enterprise application store of claim 1:

further comprising a mobile application storage system containing one or more customized mobile applications that have been customized by or on behalf of the enterprise prior to installation in a device being used by the visitor to implement policies or to otherwise operate in a manner dictated by the enterprise; and the mobile application store management system is configured to receive requests for one or more of the customized mobile applications from visitors to the mobile enterprise application store and to cause the requested one or more customized mobile applications to be delivered to the visitors in response.

7. A mobile enterprise application store associated with an enterprise, the mobile enterprise application store comprising:

a mobile application catalog storage system containing a billable mobile application catalog that catalogs at least one mobile application requiring payment to a particular wireless mobile communications carrier and a non-billable mobile application catalog that catalogs all mobile applications in the billable mobile application catalog except those that require payment to the particular wireless mobile carrier;

a mobile application store management system configured to:

receive requests from visitors to the mobile application store for a catalog of available mobile applications and in response to receiving a request for the catalog of available mobile applications:

determine whether each visitor making the request has an active account with the particular wireless mobile communication carrier;

determine between which of the billable mobile application catalog and the non-billable mobile application catalog is to be provided to each visitor such that the billable mobile application catalog is determined to be provided to each visitor that has an active account with the particular wireless mobile communication carrier and the non-billable mobile application catalog is determined to be provided to each visitor that does not have an active account with the particular wireless mobile communication carrier; and provide the determined catalog to each visitor;

the mobile application store management system further configured to:

receive requests from visitors to the mobile enterprise application store for one or more mobile applications, at least one of the mobile applications requiring consent from someone other than the visitor requesting the application before the application can be used by the visitor;

determine whether any request is for a mobile application that requires consent from someone other than the visitor before the application can be used by the visitor;

if consent is required:

automatically cause a request for the consent to be issued;

receive a response to the request for the consent;

determine whether the response is to grant the request; and dependent on the response, grant or not grant the visitor use of the mobile application such that, if the response is to grant the request, the visitor is allowed to use the mobile application, while if the response is not to grant the request, the visitor is not allowed to use the mobile application; and if consent is not required, allow the visitor to use the mobile application without issuing a request for consent.

8. The mobile enterprise application store of claim 7 wherein the mobile application store management system is configured to interface with a low level mobile device number (MDN) solution in a manner that allows the mobile application store management system to verify the authority of visitors to request mobile applications.

9. The mobile enterprise application store of claim 7:

further comprising a mobile application storage system containing one or more customized mobile applications that have been customized by or on behalf of the enterprise prior to installation in a device being used by the visitor to implement policies or to otherwise operate in a manner dictated by the enterprise; and the mobile application store management system is configured to receive requests for one or more of the customized mobile applications from visitors to the mobile enterprise application store and to cause the requested one or more customized mobile applications to be delivered to the visitors in response.

10. A mobile enterprise application store that is managed by or on behalf of an enterprise comprising:

a mobile application catalog storage system containing a billable mobile application catalog that catalogs at least one mobile application requiring payment to a particular wireless mobile communications carrier and a non-billable mobile application catalog that catalogs all mobile applications in the billable mobile application catalog except those that require payment to the particular wireless mobile carrier;

a mobile application storage system containing one or more customized mobile applications that have been customized by or on behalf of the enterprise prior to installation to implement policies or to otherwise operate in a manner dictated by the enterprise; and a mobile application store management system configured to:

receive requests from visitors to the mobile application store for a catalog of available mobile applications and in response to receiving a request for the catalog of available mobile applications:

determine whether each visitor making the request has an active account with the particular wireless mobile communication carrier;

determine between which of the billable mobile application catalog and the non-billable mobile application catalog is to be provided to each visitor such that the billable mobile application catalog is determined to be provided to each visitor that has an active account with the particular wireless mobile communication carrier and the non-billable mobile application catalog is determined to be provided to each visitor that does not have an active account with the particular wireless mobile communication carrier; and provide the determined catalog to each visitor;

the mobile application store management system further configured to:

receive requests for one or more of the customized mobile applications from visitors to the mobile enterprise application store, at least one of the mobile applications requiring consent from a person other than the visitor requesting the application before the application can be used by the visitor, the person other than the visitor being an administrator of the enterprise;

determine whether any request is for a mobile application that requires consent from a person other than the visitor before the application can be used by the visitor; and cause the requested one or more customized mobile applications to be delivered to the visitors in response to consent from the person when required.

11. The mobile enterprise application store of claim 10 wherein the mobile application store management system is configured to:

if consent is required:

automatically cause a request for the consent to be issued;

receive a response to the request for the consent;

determine whether the response is to grant the request; and dependent on the response, grant or not grant the visitor use of the mobile application such that, if the response is to grant the request, the visitor is allowed to use the mobile application, while if the response is not to grant the request, the visitor is not allowed to use the mobile application; and if consent is not required, allow the visitor to use the mobile application without issuing a request for consent.

12. The mobile enterprise application store of claim 10 wherein the mobile application store management system is configured to interface with a low level mobile device number (MDN) solution in a manner that allows the mobile application store management system to verify the authority of visitors to request mobile applications.

13. The mobile enterprise application store of claim 10 wherein:

the mobile application storage system contains a different version of each of the customized mobile applications for each of multiple different wireless mobile communication carriers; and the mobile application store management system is configured in connection with each request for a customized mobile application to:

determine the wireless mobile communication carrier being used by the visitor that made the request; and based on the determination of the wireless mobile communication carrier, cause the version of each requested mobile application that is for the wireless mobile communication carrier to be delivered to the visitor.

14. The mobile enterprise application store of claim 10 wherein:

the mobile application storage system contains a different version of each of the customized mobile applications for each of multiple different operating systems; and the mobile application store management system is configured in connection with each request for a customized mobile application to:

determine the operating system being used by the visitor that made the request;

and based on the determination of the operating system, cause the version of each requested mobile application that is for the operating system to be delivered to the visitor.

15. The mobile enterprise application store of claim 10 wherein:

the mobile application storage system contains a different version of each of the customized mobile applications for each of multiple different wireless mobile communication devices; and the mobile application store management system is configured in connection with each request for a customized mobile application to:
determine the wireless mobile communication device being used by the visitor that made the request; and
based on the determination of the wireless mobile communication device, cause the version of each requested mobile application that is for the wireless mobile communication device to be delivered to the visitor.

16. The mobile enterprise application store of claim 10 wherein the mobile application store management system is configured to cause:
a charge for at least one of the customized mobile applications that is requested to be placed on a bill of the visitor; and
a charge for at least another of the customized mobile application that is requested to be placed on a bill of the enterprise.

17. The mobile enterprise application store of claim 10 wherein:
the mobile application store management system includes a set of mobile applications that were acquired under a flat fee under a license agreement that authorized an unlimited number of the set of mobile applications to be distributed to an unlimited number of visitors without any added payment; and
the mobile application store management system is configured not to cause any charge to be imposed in connection with the delivery of any of the set of mobile applications.

18. The mobile enterprise application store of claim 10:
further comprising an accounting storage system configured to keep track of the number of each customized application that has been delivered; and
wherein the mobile application store management system is configured to restrict the number of at least one of the customized applications that can be delivered.

19. The mobile enterprise application store of claim 10 wherein:
the mobile application storage system contains a different version of each of the customized mobile applications for each of at least one of different wireless mobile communication carriers, operating systems, or wireless mobile communication devices; and
the mobile application store management system is configured in connection with each request for a customized mobile application to:
determine at least one of the wireless mobile communication carrier, operating system, or wireless mobile communication devices being used by the visitor that made the request; and
based on the determination of the at least one of the wireless mobile communication carrier, operating system, or wireless mobile communication devices, cause the version of each requested mobile application that is for the at least one of the wireless mobile communication carrier, operating system, or wireless mobile communication device to be delivered to the visitor.

20. The mobile enterprise application store of claim 10 wherein the mobile application store management system is configured to cause:
a charge for at least one of the customized mobile applications that is requested to be placed on a bill of the visitor; and
a charge for at least another of the customized mobile application that is requested to be placed on a bill of the enterprise.

21. A mobile enterprise application store system comprising:
a first mobile enterprise application store associated with a first enterprise, the first mobile enterprise application store including a first mobile application catalog that catalogs available mobile applications customized by the first enterprise;
a second mobile enterprise application store associated with a second enterprise, the second mobile enterprise application store including a second mobile application catalog that catalogs available mobile applications customized by the second enterprise;
a mobile application catalog storage system containing a billable mobile application catalog that catalogs at least one mobile application requiring payment to a particular wireless mobile communications carrier and a non-billable mobile application catalog that catalogs all mobile applications in the billable mobile application catalog except those that require payment to the particular wireless mobile carrier; and
a mobile application store management system configured to:
receive requests from visitors to the mobile application store for a catalog of available mobile applications and, in response to receiving a request for the catalog of available mobile applications:
determine whether each visitor making the request has an active account with the particular wireless mobile communication carrier;
determine between which of the billable mobile application catalog and the non-billable mobile application catalog is to be provided to each visitor such that the billable mobile application catalog is determined to be provided to each visitor that has an active account with the particular wireless mobile communication carrier and the non-billable mobile application catalog is determined to be provided to each visitor that does not have an active account with the particular wireless mobile communication carrier; and
provide the determined catalog to each visitor.

22. The system of claim 21, wherein the first enterprise and the second enterprise are each a different business or organization.

23. The system of claim 21, wherein the first mobile enterprise application store includes applications that are unique to the first mobile enterprise application store and the second mobile enterprise application store includes applications that are unique to the second mobile enterprise application store.

* * * * *